United States Patent
Luo et al.

(10) Patent No.: US 12,107,542 B2
(45) Date of Patent: Oct. 1, 2024

(54) METHOD FOR INSTALLING MAXIMUM POWER POINT TRACKING (MPPT) CONTROLLER, AND PHOTOVOLTAIC SYSTEM

(71) Applicants: HUANENG CLEAN ENERGY RESEARCH INSTITUTE, Beijing (CN); HUANENG GROUP R&D CENTER CO., LTD, Beijing (CN)

(72) Inventors: Lizhen Luo, Beijing (CN); Wenbo Peng, Beijing (CN); Ping Xiao, Beijing (CN); Dongming Zhao, Beijing (CN); Xiaolei Li, Beijing (CN); Xiangrui Yu, Beijing (CN); Wenzhe Zhu, Beijing (CN); Hu Gao, Beijing (CN)

(73) Assignees: HUANENG CLEAN ENERGY RESEARCH INSTITUTE, Beijing (CN); HUANENG GROUP R&DCENTER CO., LTD, Beijing (CN)

( * ) Notice: Subject to any disclaimer, the term of this patent is extended or adjusted under 35 U.S.C. 154(b) by 0 days.

(21) Appl. No.: 18/557,165

(22) PCT Filed: Jun. 23, 2022

(86) PCT No.: PCT/CN2022/100718
§ 371 (c)(1),
(2) Date: Oct. 25, 2023

(87) PCT Pub. No.: WO2023/077825
PCT Pub. Date: May 11, 2023

(65) Prior Publication Data
US 2024/0097617 A1    Mar. 21, 2024

(30) Foreign Application Priority Data
Nov. 3, 2021 (CN) .......................... 202111296367.9

(51) Int. Cl.
*H02S 50/15* (2014.01)
*H02S 40/30* (2014.01)

(52) U.S. Cl.
CPC .............. *H02S 50/15* (2014.12); *H02S 40/30* (2014.12); *H02J 2300/26* (2020.01)

(58) Field of Classification Search
CPC ....... H02S 50/15; H02S 40/30; H02J 2300/26
See application file for complete search history.

(56) References Cited

U.S. PATENT DOCUMENTS

| 5,654,883 A | 8/1997 | Takehara et al. |
| 2013/0246010 A1 | 9/2013 | Dershowitz et al. |

FOREIGN PATENT DOCUMENTS

| CN | 105280738 A | 1/2016 |
| CN | 105700614 A | 6/2016 |

(Continued)

OTHER PUBLICATIONS

International Search Report corresponding to PCT Application No. PCT/CN2022/100718, mailed Sep. 21, 2022 (Chinese and English language document) (8 pages).

(Continued)

*Primary Examiner* — Robert L Deberadinis

(57) ABSTRACT

A method for installing a maximum power point tracking (MPPT) controller is provided. The method includes acquiring an occlusion area proportion of a photovoltaic string in a photovoltaic system, optimizing the occlusion area proportion to generate a target occlusion area proportion, determining a target position from the photovoltaic string according to the target occlusion area proportion, and installing the MPPT controller at the target position.

8 Claims, 4 Drawing Sheets

(56) References Cited

FOREIGN PATENT DOCUMENTS

| | | | |
|---|---|---|---|
| CN | 105978483 | A | 9/2016 |
| CN | 106982030 | A | 7/2017 |
| CN | 108062141 | A | 5/2018 |
| CN | 108874739 | A | 11/2018 |
| CN | 109088580 | A | 12/2018 |
| CN | 110266055 | A | 9/2019 |
| CN | 213027947 | U | 4/2021 |
| CN | 213242565 | U | 5/2021 |
| CN | 113348623 | A | 9/2021 |
| CN | 113470016 | A | 10/2021 |
| CN | 114326915 | A | 4/2022 |
| JP | 2016-38816 | A | 3/2016 |

OTHER PUBLICATIONS

Zhang et al., "Modeling and Analysis of Mismatch Characteristics of Pv Array under Shading Conditions," Acta Energiae Solaris Sinica, Sep. 30, 2014 (Sep. 30, 2014), pp. 1592-1597, vol. 35, No. 9, ISSN: 0254-0096.
OA for CN application 202111296367.9.
English translation of OA for CN application 202111296367.9.
Notice of Allowance for CN application 202111296367.9.
English translation of Notice of Allowance for CN application 202111296367.9.

METHOD FOR INSTALLING MAXIMUM POWER POINT TRACKING (MPPT) CONTROLLER, AND PHOTOVOLTAIC SYSTEM

CROSS-REFERENCE TO RELATED APPLICATION

This application is a National Stage Application under 35 USC § 371 of International Application PCT/CN2022/100718, filed on Jun. 23, 2022, which claims priority to and benefits of Chinese Patent Application No. 202111296367.9, entitled "METHOD FOR INSTALLING MAXIMUM POWER POINT TRACKING (MPPT) CONTROLLER, AND PHOTOVOLTAIC SYSTEM", filed with the China National Intellectual Property Administration on Nov. 3, 2021, the entire contents of which are incorporated herein by reference.

FIELD

The present disclosure relates to the technical field of photovoltaic systems, and especially to a method for installing a maximum power point tracking (MPPT) controller, and a photovoltaic system.

BACKGROUND

A Photovoltaic power generation system is a typical series-parallel power system, and series-parallel mismatch is a very important factor affecting its power. Mismatch appears as a "barrel effect" in a photovoltaic system, that is, the failure of a small number of components in the system will cause a large decrease in the total power generation of the system. A maximum power point tracking (MPPT) system is an electrical system that enables a photovoltaic panel to output more electric energy by adjusting a working state of electrical modules.

At present, a photovoltaic power generation system often adopts a photovoltaic string-level MPPT technology, an array-level MPPT technology, and a component-level MPPT technology. The photovoltaic string-level MPPT technology and the array-level MPPT technology improve power station efficiency by optimizing the power of strings and arrays, but they cannot solve series-parallel mismatch between photovoltaic components. The component-level MPPT technology is to connect each photovoltaic component with an MPPT controller to solve electrical mismatch between photovoltaic components. However, MPPT may optimize the power merely when the photovoltaic panel has some faults, such as occlusion, and there will be a certain amount of power loss when the photovoltaic component works normally, reducing the output power of the module.

SUMMARY

A first embodiment of the present disclosure provides a method for installing a maximum power point tracking (MPPT) controller. The method includes acquiring an occlusion area proportion of a photovoltaic string in a photovoltaic system, optimizing the occlusion area proportion to generate a target occlusion area proportion, determining a target position from the photovoltaic string according to the target occlusion area proportion, and installing the MPPT controller at the target position.

A second embodiment of the present disclosure provides a photovoltaic system. The photovoltaic system includes a photovoltaic string, and the photovoltaic string is configured to implement the installation of a maximum power point tracking (MPPT) controller by using the above-mentioned method for installing the MPPT controller.

Additional aspects and advantages of the present disclosure will be set forth, in part, in the following description, and in part will be apparent from the following description, or learned by practice of the present disclosure.

BRIEF DESCRIPTION OF THE DRAWINGS

The above-mentioned and/or additional aspects and advantages of the present disclosure will be apparent and readily understood from the following description of embodiments taken in conjunction with the accompanying drawings.

DETAILED DESCRIPTION

Figure 1:
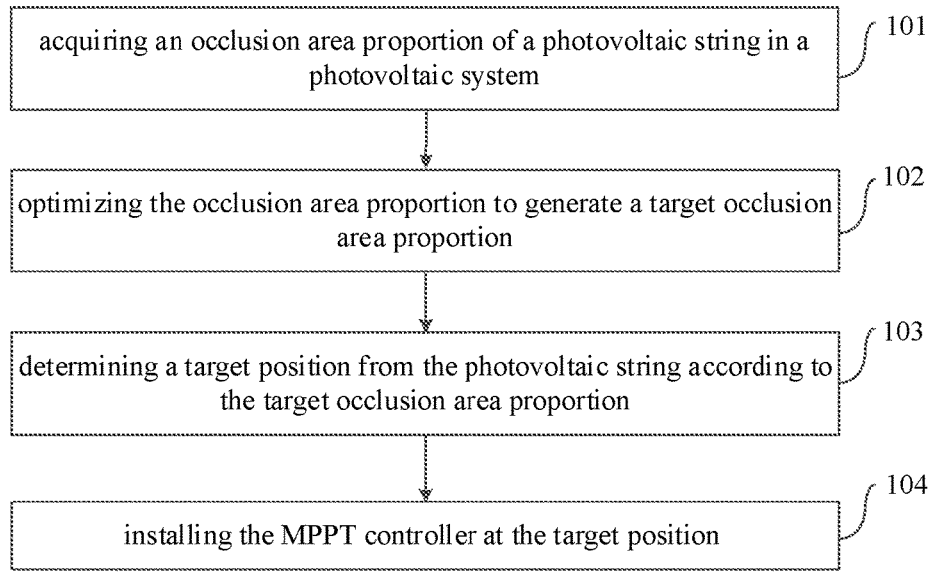
FIG. 1 is a flow chart of a method for installing a maximum power point tracking (MPPT) controller according to an embodiment of the present disclosure.

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are intended to explain the present disclosure and cannot be construed as limiting the present disclosure.

The present disclosure aims at solving at least one of the technical problems in the above-mentioned technologies to some extent. Therefore, an object of the present disclosure is to provide a method for installing a maximum power point tracking (MPPT) controller, which may improve the overall power generation efficiency of a photovoltaic system, save the cost of a photovoltaic system and improve the earning yield.

A second object of the present disclosure is to provide a photovoltaic system.

A method for installing a maximum power point tracking (MPPT) controller and a photovoltaic system according to embodiments of the present disclosure will be described below with reference to the accompanying drawings.

FIG. 1 is a flow chart of a method for installing a maximum power point tracking (MPPT) controller according to an embodiment of the present disclosure.

As shown in FIG. 1, the method for installing the MPPT controller may include steps as follows.

In step 101, an occlusion area proportion of a photovoltaic string in a photovoltaic system is acquired, in which a number of photovoltaic strings may be multiple.

Figure 2:
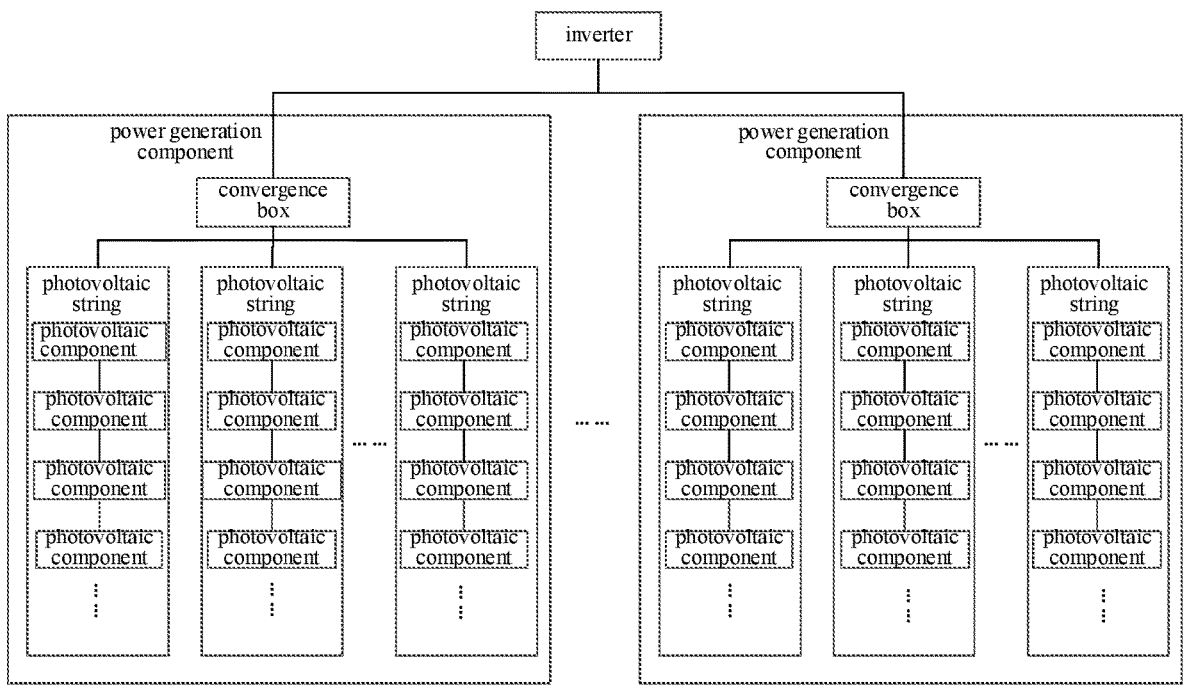
FIG. 2 is a schematic diagram of a photovoltaic system according to an embodiment of the present disclosure.

It is to be noted that the photovoltaic system described in the embodiment may be referred to FIG. 2. FIG. 2 is a schematic diagram of a photovoltaic system according to an embodiment of the present disclosure. The photovoltaic system may include an inverter and a plurality of power generation components. Each power generation component in the plurality of power generation components may include a convergence box and a plurality of photovoltaic strings. Each photovoltaic string in the plurality of photovoltaic strings may be composed of a plurality of photovoltaic components (for example, photovoltaic panels) connected in series. Referring to FIG. 2, the plurality of photovoltaic strings in the power generation component may be connected in parallel to one end of the convergence box, and the other end of the convergence box may be connected to the inverter. The other end of each convergence box in the plurality of power generation components may be connected with the inverter after being connected in parallel.

In the embodiment of the present disclosure, the above-mentioned occlusion area proportion may be preset. Many factors need to be considered when setting the occlusion area proportion, for example, terrain of a power station where the photovoltaic system is located, layout characteristics of a power station where the photovoltaic system is located, and the like. A preset occlusion area proportion may be pre-stored in a storage space of an electronic device, such as a personal computer (PC), a mobile phone, a tablet computer, and the like for easy acquisition when needed.

To clearly illustrate the previous embodiment, in an embodiment of the present disclosure, acquiring the occlusion area proportion of the photovoltaic string in the photovoltaic system may include determining the occlusion area proportion based on the terrain and the layout characteristics of the power station where the photovoltaic system is located.

In the embodiment of the present disclosure, due to limitations of the terrain and the layout of the power station where the photovoltaic system is located (namely, the layout characteristics, for example, a height and shape of a photovoltaic string arrangement of the photovoltaic system in the power station, etc.), a photovoltaic panel in the photovoltaic string may be occluded, for example, the photovoltaic panel may be occluded by objects such as mountains, vegetation and buildings, thus affecting the power generation efficiency. Relevant staff may determine (predict) an occlusion area of the photovoltaic string according to the terrain and the layout characteristics of the power station where the photovoltaic system is located, and acquire a total area of the photovoltaic string, and then calculate the occlusion area proportion according to the occlusion area and total area of the photovoltaic string.

As a possible situation, it is possible to detect whether the photovoltaic string is occluded by a related sensor (for example, a light sensor) installed in the photovoltaic system. In case that the photovoltaic string is occluded, occluded shadow information is sent to an electronic device, and the electronic device may calculate the occlusion area according to the shadow information, and calculate the occlusion area proportion according to the occlusion area and the total area of the photovoltaic string. It is to be noted that the electronic device described in the embodiment may be a computer or a server, etc., which is not limited herein.

In step 102, the occlusion area proportion is optimized to generate a target occlusion area proportion.

In an embodiment of the present disclosure, the occlusion area proportion may be optimized according to a preset optimization strategy to generate the target occlusion area proportion. The preset optimization strategy may be calibrated according to an actual situation.

Specifically, after acquiring the occlusion area proportion of the photovoltaic string in the photovoltaic system, the occlusion area proportion may be optimized according to the preset optimization strategy to generate the target occlusion area proportion.

Figure 3:
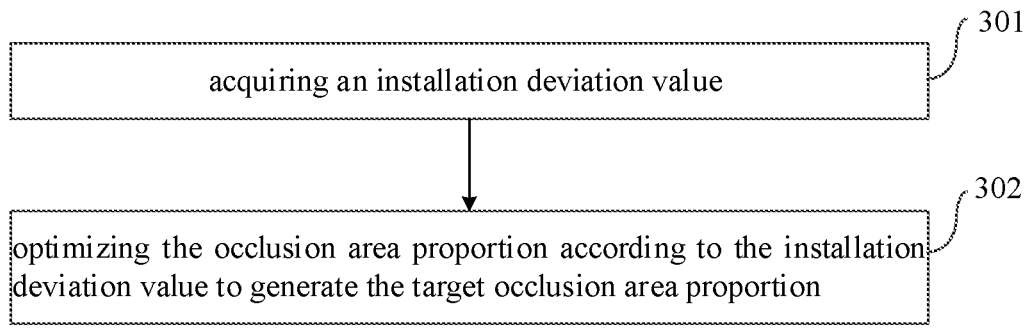
FIG. 3 is a flow chart of a method for installing a maximum power point tracking (MPPT) controller according to another embodiment of the present disclosure.

To clearly illustrate the previous embodiment, in an embodiment of the present disclosure, as shown in FIG. 3, optimizing the occlusion area proportion to generate the target occlusion area proportion includes may include steps as follows.

In step 301, an installation deviation value is acquired.

The installation deviation value may be calibrated according to an actual situation.

It is to be noted that the installation deviation value described in the embodiment may be preset and pre-stored in a storage space of an electronic device for easy acquisition when needed.

In step 302, the occlusion area proportion is optimized according to the installation deviation value to generate the target occlusion area proportion.

In an embodiment of the present disclosure, after the installation deviation value is acquired, the occlusion area proportion may be optimized through the following formula (1) to calculate the target occlusion area proportion.

$$S' = Z * S \tag{1}$$

where S' may be the target occlusion area proportion, Z may be an installation deviation range, 80%≤Z≤120%, and S may be the occlusion area of the photovoltaic string.

Specifically, after acquiring the installation deviation value and the occlusion area proportion of the photovoltaic string, the target occlusion area proportion may be calculated through the above-mentioned formula (1) to optimize the occlusion area.

In step 103, a target position is determined from the photovoltaic string according to the target occlusion area proportion.

Figure 4:
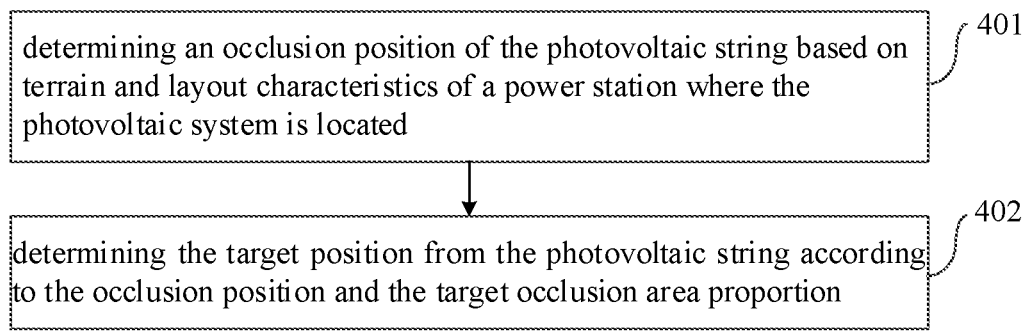
FIG. 4 is a flow chart of a method for installing a maximum power point tracking (MPPT) controller according to another embodiment of the present disclosure.

To clearly illustrate the previous embodiment, in an embodiment of the present disclosure, as shown in FIG. 4, determining the target position from the photovoltaic string according to the target occlusion area proportion may include steps as follows.

In step 401, an occlusion position of the photovoltaic string is determined based on terrain and layout characteristics of a power station where the photovoltaic system is located.

In an embodiment of the present disclosure, relevant staff may determine (predict) the occlusion position of the photovoltaic string according to the terrain and the layout characteristics of the power station where the photovoltaic system is located.

As a possible situation, it is possible to detect whether the photovoltaic string is occluded by a related sensor (for example, a light sensor) installed in the photovoltaic system. In case that the photovoltaic string is occluded, the occlusion position of the photovoltaic string is acquired.

In step 402, the target position is determined from the photovoltaic string according to the occlusion position and the target occlusion area proportion.

In an embodiment of the present disclosure, the target position may be determined from the photovoltaic string based on a preset determination strategy and according to the occlusion position and the target occlusion area proportion. The preset determination strategy may be calibrated according to an actual situation.

Specifically, after acquiring the occlusion position and the target occlusion area proportion, the target position may be determined from the photovoltaic string based on the preset determination strategy and according to the occlusion position and the target occlusion area proportion.

Figure 5:
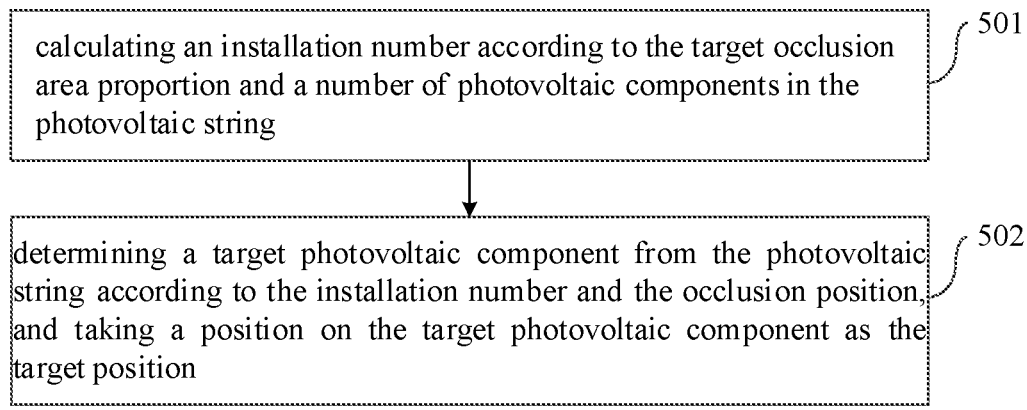
FIG. 5 is a flow chart of a method for installing a maximum power point tracking (MPPT) controller according to another embodiment of the present disclosure.

To clearly illustrate the previous embodiment, in an embodiment of the present disclosure, as shown in FIG. 5, determining the target position from the photovoltaic string according to the occlusion position and the target occlusion area proportion may include steps as follows.

In step 501, an installation number is calculated according to the target occlusion area proportion and a number of photovoltaic components in the photovoltaic string. The photovoltaic component and the target photovoltaic component may be a photovoltaic panel.

In an embodiment of the present disclosure, the installation number may be calculated through the following formula (2).

$$N=S'*n \quad (2)$$

where S' may be the target occlusion area, n may be the number of photovoltaic components, and N may be the installation number.

Specifically, after acquiring the target occlusion area proportion and the number of photovoltaic components in the photovoltaic string, the installation number may be calculated through the above-mentioned formula (2), where the installation number N may be a largest integer not less than S'*n, for example, when S'*n<1, the installation number N may be 1. In addition, when S'=0, it means that the photovoltaic component is not occluded, and it is not necessary to install the MPPT controller at this time, then N=0.

In step 502, a target photovoltaic component is determined from the photovoltaic string according to the installation number and the occlusion position, and a position on the target photovoltaic component is taken as the target position. A number of the target positions is equal to the installation number.

Specifically, after acquiring the installation number and the occlusion position, an occluded component in the photovoltaic string may be taken as a photovoltaic component to be determined, and then the installation number of photovoltaic components may be arbitrarily taken out from the photovoltaic component to be determined as the target photovoltaic component, and the position on the target photovoltaic component may be taken as the target position.

Further, in an embodiment of the present disclosure, the method for installing the MPPT controller may include determining a target line from the photovoltaic string in response to determining that the target occlusion area proportion is greater than or equal to a proportion threshold, and taking a position on the target line as the target position. The target line is a series line of photovoltaic components in the photovoltaic string. It is to be noted that the proportion threshold (generally 50%) described in the embodiment may be calibrated according to an actual situation.

Specifically, after acquiring the target occlusion area proportion, it may be determined whether the target occlusion area proportion is greater than or equal to the proportion threshold. In case that the target occlusion area proportion is greater than or equal to the proportion threshold, the target line may be determined from an occluded photovoltaic string (that is, the series line of photovoltaic components in the occluded photovoltaic string is determined as the target line), and the position on the target line is taken as the target position. In case that the target occlusion area proportion is not greater than or equal to the proportion threshold, it means that there is no need to install the MPPT controller on the series line of photovoltaic components in the occluded photovoltaic string.

In step 104, the MPPT controller is installed at the target location.

To clearly illustrate the previous embodiment, in an embodiment of the present disclosure, the MPPT controller includes a component-level MPPT controller and a string-level MPPT controller, and installing the MPPT controller at the target position may include installing the component-level MPPT on the target photovoltaic component, and installing the string-level MPPT controller on the target line.

In an embodiment of the present disclosure, in case that the target occlusion area proportion is less than the proportion threshold, the component-level MPPT is installed on the target photovoltaic component (the photovoltaic panel). In case that the target occlusion area proportion is greater than or equal to the proportion threshold, it is necessary to install the string-level MPPT controller on the target line. Therefore, different installation methods may be used according to a proportion of the target occlusion, so that the installation of the MPPT controller is more reasonable, thus effectively improving the power generation efficiency of the photovoltaic system.

Figure 6:
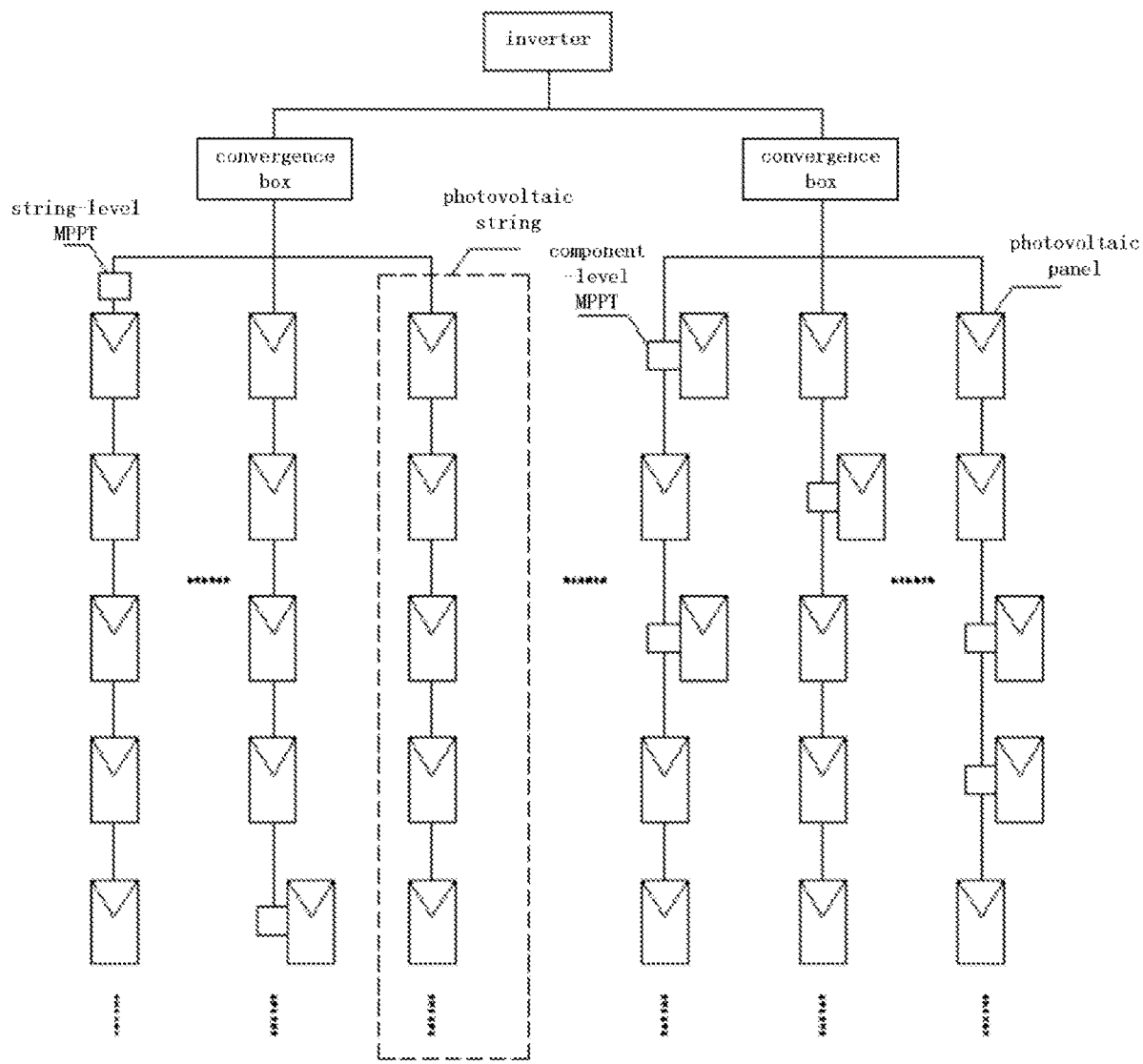
FIG. 6 is a schematic diagram of a photovoltaic system that completes the installation of a maximum power point tracking (MPPT) controller according to an embodiment of the present disclosure.

Specifically, after determining the target position, in which the target position may include the position on the target photovoltaic component and the position on the target line, firstly, the component-level MPPT may be installed on the target photovoltaic component, and the string-level MPPT controller may be installed on the target line. The MPPT controller may be installed for each photovoltaic string in the photovoltaic system based on the method for installing the MPPT controller provided in the embodiment of the present disclosure. A photovoltaic system that completes the installation of the MPPT controller may be referred to FIG. 6.

Figure 7:
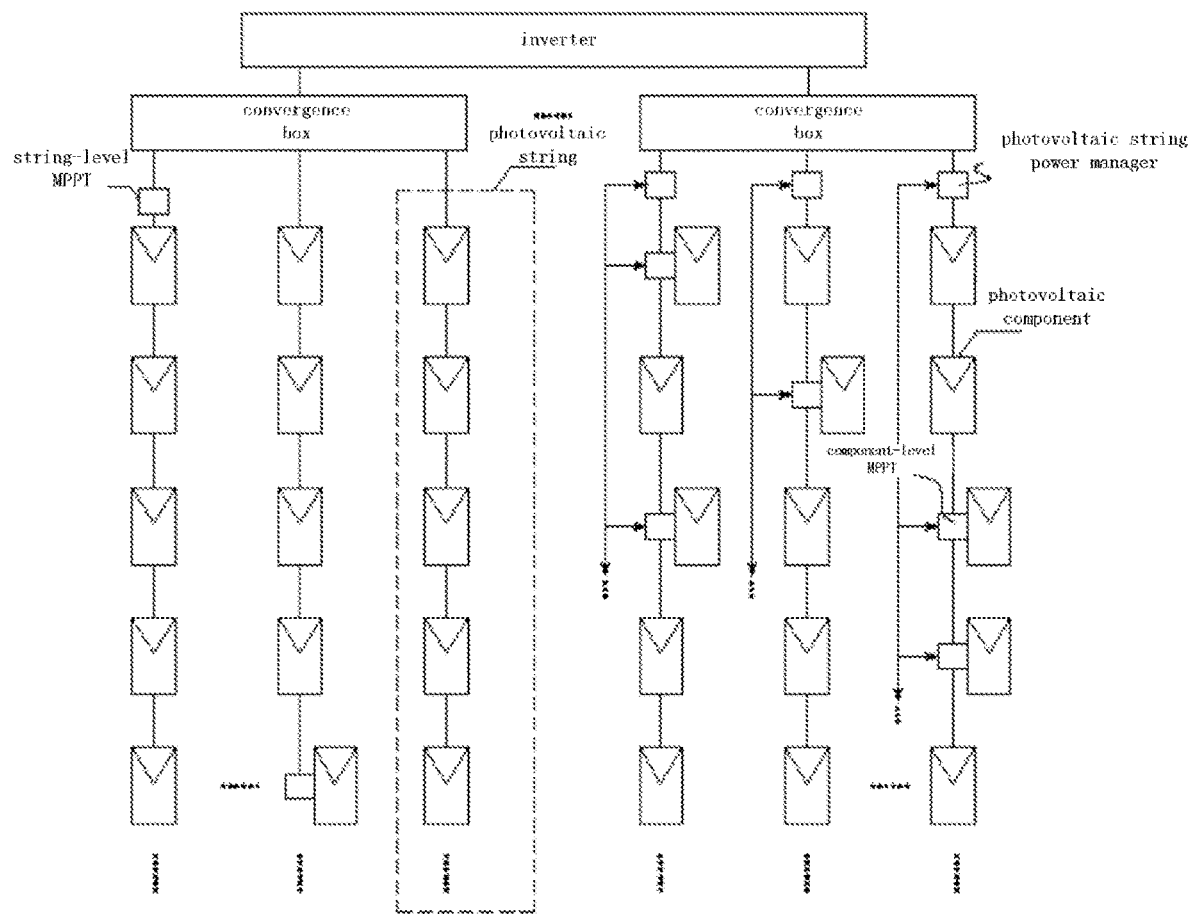
FIG. 7 is a schematic diagram of a photovoltaic system that completes the installation of a maximum power point tracking (MPPT) controller according to another embodiment of the present disclosure.

Further, in an embodiment of the present disclosure, referring to FIG. 7, for a photovoltaic string installed with a component-level MPPT controller, a photovoltaic string power manager may be installed in the photovoltaic string, and the photovoltaic string power manager may be connected with all the component-level MPPT controllers in the photovoltaic string, so that all the component-level MPPT controllers in the photovoltaic string are connected with each other. An output parameter of the MPPT controller may be set to the maximum power of a string. The photovoltaic string power manager may be used to collect a current, voltage and power data of the photovoltaic string, and feed back a collected current, voltage and power data to the component-level MPPT controller in the photovoltaic string, so that the component-level MPPT controller not only optimizes the power of a single component, but also optimizes the power of the entire photovoltaic string.

Furthermore, in an embodiment of the present disclosure, a direct current (DC) end of the component-level MPPT controller in the photovoltaic string may adjust its own current and voltage output based on the maximum power of the photovoltaic string power manager, so as to achieve a better optimization effect. In the embodiment of the present disclosure, firstly, the occlusion area proportion of the photovoltaic string in the photovoltaic system is acquired, then the occlusion area proportion is optimized to generate the target occlusion area proportion, the target position is determined from the photovoltaic string according to the target occlusion area proportion, and, finally, the MPPT controller is installed at the target position. Therefore, the overall power generation efficiency of the photovoltaic system may be improved, the cost of the photovoltaic system is saved, and the earning yield is increased.

In order to implement the above-mentioned embodiment, the present disclosure also provides a photovoltaic system. The photovoltaic system includes a photovoltaic string, and the photovoltaic string is configured to implement the installation of a maximum power point tracking (MPPT) controller by using the above-mentioned method.

In the photovoltaic system provided in the embodiment of the present disclosure, the installation of the MPPT controller is implemented by using the above-mentioned method for installing the MPPT controller. Therefore, the overall power generation efficiency of the photovoltaic system may be improved, the cost of the photovoltaic system is saved, and the earning yield is increased.

In the specification, it is to be understood that the orientation or positional relationship indicated by terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise" "axial", "radial", and "circumferential" is based on the orientation or positional relationship shown in the accompanying drawings, which is only for the convenience of describing the present disclosure and simplifying the description, but do not alone indicate or imply that the device or element referred to must have a particular orientation, be constructed and operated in a particular orientation, so it cannot be construed as a limitation of the present disclosure.

In addition, terms such as "first" and "second" are merely used for purposes of description, but cannot be construed as indicating or implying relative importance or implicitly specifying the number of technical features indicated. Thus, the feature defined with "first" and "second" may explicitly or implicitly include one or more of such a feature. In the description of the present disclosure, "a plurality of" means two or more than two, unless otherwise expressly and specifically limited.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via an intermediary; may also be inner communications of two elements or an interaction relationship between two elements. For those skilled in the art, the specific meanings of the above-mentioned terms in the present disclosure may be understood according to specific situations.

In the present disclosure, unless specified or limited otherwise, a first feature is "on" or "below" a second feature may be that the first feature is in direct contact with the second feature, or the first feature and the second feature are not in direct contact with each other via an intermediary. Furthermore, a first feature "on", "above", or "on top of" a second feature may be that the first feature is right or obliquely "on", "above", or "on top of" the second feature, or just means that the first feature is at a height higher than that of the second feature. A first feature "below", "under", or "on bottom of" a second feature may be that the first feature is right or obliquely "below", "under", or "on bottom of" the second feature, or just means that the first feature is at a height lower than that of the second feature.

Reference throughout this specification to terms "an embodiment", "some embodiments", "an example", "a specific example", or "some examples", etc., means that a particular feature, structure, material, or characteristic described in connection with the embodiment or example is included in at least one embodiment or example of the present disclosure. Schematic expressions of the above terms throughout this specification are not necessarily referring to the same embodiment or example. Furthermore, the particular features, structures, materials, or characteristics described may be combined in any suitable manner in one or more embodiments or examples. In addition, those skilled in the art can combine the different embodiments or examples and the features of the different embodiments or examples described in this specification without being mutually inconsistent.

Although embodiments of the present disclosure have been shown and described above, it is appreciated that the above embodiments are illustrative and cannot be construed to limit the present disclosure, and variations, modifications, replacements and variants of the above embodiments can be made by those skilled in the art within the scope of the present disclosure.

What is claimed is:

1. A method for installing a maximum power point tracking (MPPT) controller, comprising:
   acquiring an occlusion area proportion of a photovoltaic string in a photovoltaic system;
   optimizing the occlusion area proportion through a formula to generate a target occlusion area proportion, wherein the expression of the formula is:

$$S'=Z*S$$

where S' is the target occlusion area proportion, Z is an installation deviation value, 80%≤Z≤120%, and S is the occlusion area proportion of the photovoltaic string;
   calculating an installation number of the MPPT controller according to the target occlusion area proportion and a number of photovoltaic components in the photovoltaic string, and determining a target position from the photovoltaic string according to the installation number and an occlusion position of the photovoltaic string; and
   installing the MPPT controller at the target position.

2. The method of claim 1, wherein acquiring the occlusion area proportion of the photovoltaic string in the photovoltaic system comprises:
   determining the occlusion area proportion based on terrain and layout characteristics of a power station where the photovoltaic system is located.

3. The method of claim 1, wherein
   the occlusion position of the photovoltaic string is determined based on terrain and layout characteristics of a power station where the photovoltaic system is located.

4. The method of claim 1, wherein determining the target position from the photovoltaic string according to the installation number and the occlusion position of the photovoltaic string comprises:
   determining a target photovoltaic component from the photovoltaic string according to the installation number and the occlusion position; and
   taking a position on the target photovoltaic component as the target position.

5. The method of claim 4, further comprising:
determining a target line from the photovoltaic string in response to determining that the target occlusion area proportion is greater than or equal to a proportion threshold, and taking a position on the target line as the target position.

6. The method of claim 5, wherein the MPPT controller comprises a component-level MPPT controller and a string-level MPPT controller, and installing the MPPT controller at the target position comprises:
   installing the component-level MPPT on the target photovoltaic component; and
   installing the string-level MPPT controller on the target line.

7. The method of claim 5, wherein the target photovoltaic component is a photovoltaic panel, and the target line is a series line of photovoltaic components in the photovoltaic string.

8. A photovoltaic system, wherein the photovoltaic system comprises a photovoltaic string, and the photovoltaic string is configured to implement the installation of a maximum power point tracking (MPPT) controller by using the method of claim 1.

* * * * *